May 18, 1965   J. D. SCHMUNK ETAL   3,183,571
PERFORATING MACHINE FOR CLAY DRAIN TILE
Filed May 3, 1963   2 Sheets-Sheet 1

INVENTORS.
JOHN D. SCHMUNK
HALL E. GILLILAND
BY
*Malcolm W. Fraser*
ATTORNEY

May 18, 1965   J. D. SCHMUNK ETAL   3,183,571
PERFORATING MACHINE FOR CLAY DRAIN TILE
Filed May 3, 1963   2 Sheets-Sheet 2
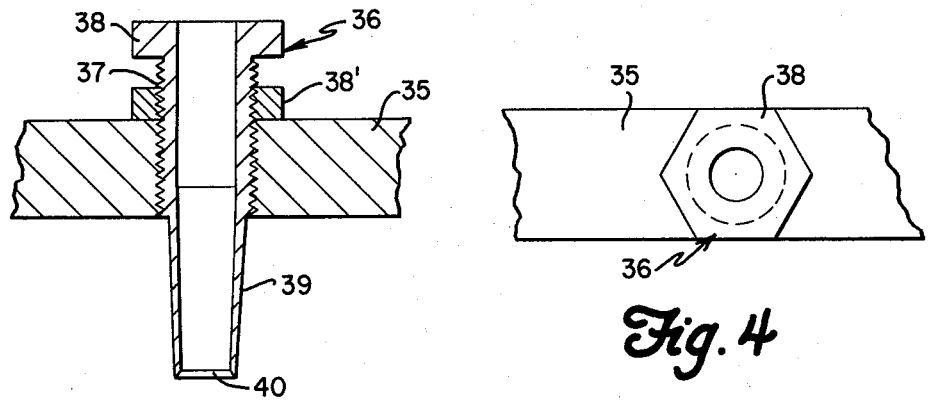
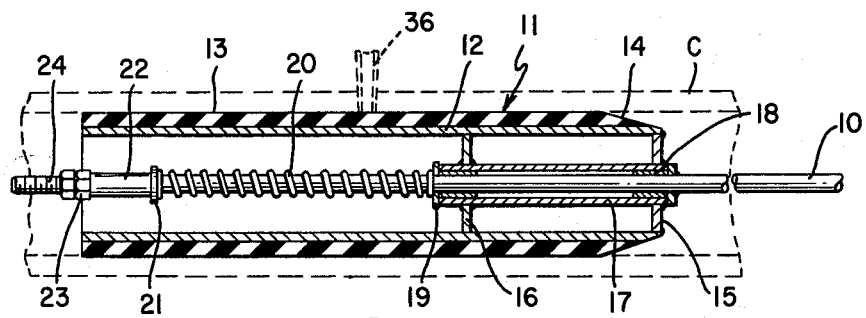
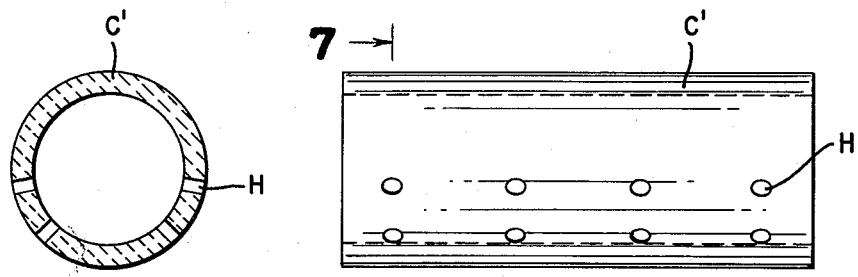
INVENTORS.
JOHN D. SCHMUNK
HALL E. GILLILAND
BY
ATTORNEY

United States Patent Office 3,183,571
Patented May 18, 1965

3,183,571
PERFORATING MACHINE FOR CLAY
DRAIN TILE
John D. Schmunk and Hall E. Gilliland, Findlay, Ohio, assignors to The Hancock Brick and Tile Company, Findlay, Ohio, a corporation of Ohio
Filed May 3, 1963, Ser. No. 277,846
3 Claims. (Cl. 25—105)

This invention relates to a machine for perforating tubular columns of clay issuing in a soft plastic state from an extruder, such columns being subsequently severed into lengths suitable for use as drain tile.

An object is to produce a machine of this character which operates recurrently and automatically to perforate the soft clay in such manner as to form cylindrical holes in the column as the latter continuously advances.

Another object is to produce a soft clay tile perforating machine which during the punching or perforating operation travels along with the continuously moving column from the extruder until perforating has been accomplished, after which it returns to a station for perforating an oncoming portion of the column, such operation continuing so long as the clay column advances.

A further object is to provide a tile perforator with a hollow punch through which slugs from the tile are ejected.

A still further object is to produce a machine for perforating a column of soft clay as it continuously advances from the extruder and which travels with and is impelled by the moving column until perforating has been accomplished, after which it retracts to repeat the operation on a succeeding portion of the column.

A still further object is to produce a perforating machine of the above type in which the machine retracts by power means which at the same time tensions a spring subsequently aiding in the movement of the machine with the clay column during the perforating operation.

A still further object is to provide a mandrel over which the clay column advances and against which the perforating punches engage after penetrating the column and which travels with the perforating machine in a recurrent manner.

Other objects and advantages of the invention will hereinafter appear and, for purposes of illustration but not of limitation, an embodiment of the invention is shown on the accompanying drawings, in which FIGURE 1 is a schematic side elevation of a perforating machine for perforating twin tubular columns of soft clay as they issue and continuously advance from an extruder, the machine being shown in position after having traveled along with the clay columns and preparatory to its retracting movement;

FIGURE 3 is an enlarged vertical sectional view of one of the perforating punches and a fragment in section of the respective carrier bar;

FIGURE 4 is a top plan view of the punch shown in FIGURE 3;

FIGURE 5 is a longitudinal sectional view of one of the mandrels, over which a clay column advances;

FIGURE 6 is a plan view of a perforated drain tile after being severed from the column; and FIGURE 7 is a transverse section view substantially on the line 7—7 of FIGURE 6.

Figure 1:
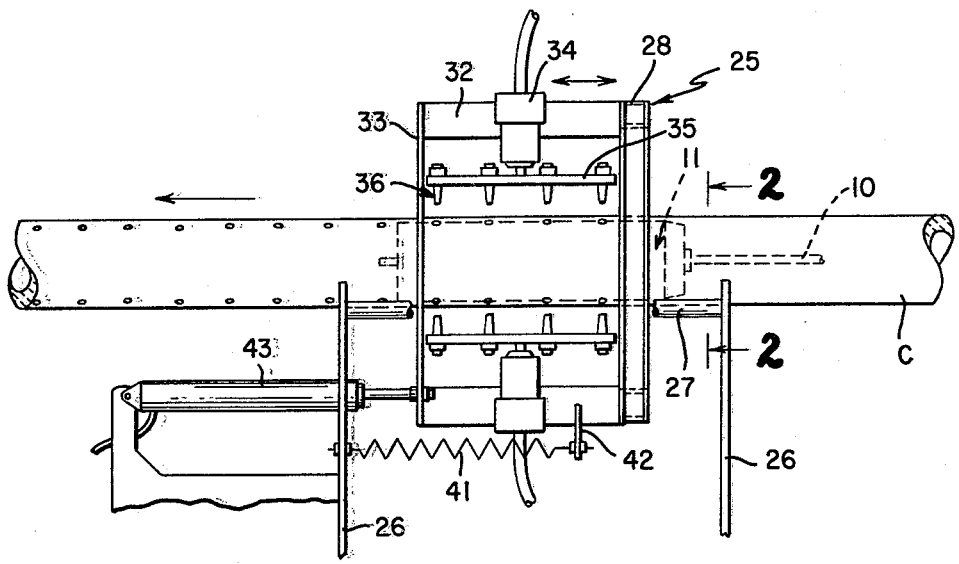

The illustrated embodiment of the invention comprises a machine for perforating tubular soft clay columns C as they continuously advance from an extruder (not shown). These columns which are arranged in laterally spaced parallel pairs advance continuously at a substantially uniform rate of speed. Suitably fixed to the extruder and extending forwardly therefrom and over which each clay column advances is a guide rod 10 arranged coaxially with the respective column. Slideable on each guide rod 10 is a mandrel 11. The mandrel 11 comprises an elongate metallic tube 12, which is covered throughout its length by a rubber sleeve 13, the forward end of which is tapered as indicated at 14. The dimensions are such that the inner wall of each clay column C passes over and contacts with the outer surface of the rubber sleeve 13. Thus the snug fit of the clay columns C with the mandrels militates against distortion of the columns when perforating takes place, as will hereinafter appear.

Within the metallic tube 13 is a bearing housing disposed at the front end thereof. The bearing housing has a pair of longitudinally spaced end plates 15 and 16, the plate 15 being welded to the tube 12 but the plate 16 having a snug fit within the tube. The plates 15 and 16 are centrally apertured to receive an elongate bearing sleeve 17 which is welded to the plates and fitting within the end portions of the sleeve 17 are bushings 18 slideably to receive the respective rod 10. At the inner end of the sleeve 17 is a loose washer 19 providing an abutment for one end of a helical coil spring 20, which encircles the respective rod 10 and bears at its opposite end against a loose washer 21 which in turn abuts against a spacer tube 22. The tube 22 in turn bears against lock nuts 23 on the screw threaded end portion 24 of the rod.

It will be understood that the mandrel 11 is movable along the rod 10, and as it moves to the left of FIGURE 5, it compresses the coil spring 20, which operates to return the mandrel to its right-hand position after the punches have retracted, as will hereinafter appear.

Figure 2:
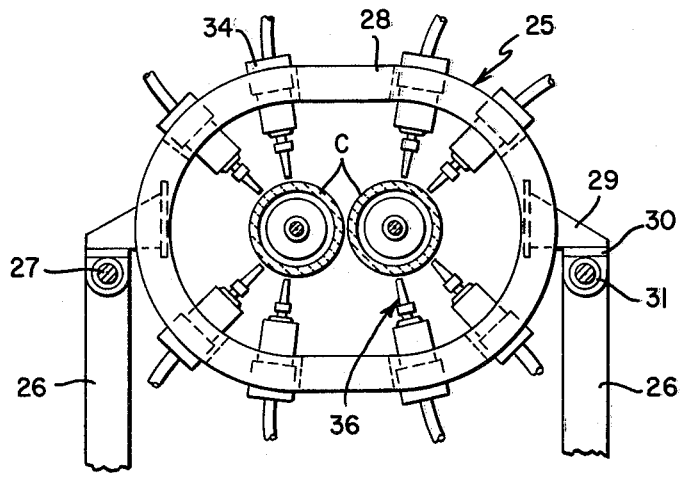
FIGURE 2 is a schematic elevation of the perforating machine taken substantially on the line 2—2 of FIGURE 1.

As shown on FIGURES 1 and 2, a reciprocating dolly 25 is carried by a suitable supporting frame having spaced uprights 26 which are arranged in pairs on opposite sides of the clay columns C. Connecting the upper ends of each pair of uprights is a horizontally disposed rod 27. The dolly 25 comprises an oval frame 28 through which the clay columns C travel. On opposite sides of the frame 28 are laterally extending brackets 29 provided with depending bearing supports 30 equipped with ball-carrying bushings 31 which ride along the rods 27 respectively as the dolly moves to and fro.

Fixed to the dolly frame 28 and forming a part thereof is a plurality of horizontally disposed spaced supports 32. The opposite ends of the supports 32 are connected to an oval end frame 33. Mounted on the horizontal supports 32 and arranged in radial relation is a plurality of piston and cylinder assemblies 34. These constitute single action quick exhaust air operated assemblies, each being provided with a compression return spring (not shown) for its piston. Carried by the piston rod of each of the assemblies 34 is a horizontally disposed carrier bar 35 arranged parallel to the respective clay column C and movable toward and away therefrom for effecting perforation thereof, as will be explained. It is preferable that each of the piston rods carrying a carrier bar 35 be mounted for non-rotative movement in order to insure that the carrier bar maintains its desired position in relation to the column C.

In this instance each carrier bar 35 is provided with four equi-distantly spaced punches 36 for effecting the perforating operation. Preferably the punches on each carrier bar are such as to predetermine the length of the finished drain tile as it is subsequently severed from the columns C. The severing of the columns C to provide the drain tile of the desired length is not shown because the same forms no part of the present invention.

As shown in FIGURES 3 and 4 each punch 36 comprises an elongate externally screw threaded sleeve 37 of uniform bore, the same being screw threaded through the respective carrier bar 35. The sleeve 37 is provided with a wrench receiving head 38 and a suitable lock nut 38'. Integral with the sleeve 37 is an elongate punching nose 39 which is tapered both on the inside and the outside with the smaller portion being at the outer or free end. At the free end is a beveled cutting end 40 enabling it to penetrate properly through the walls of the clay column C.

In the operation of the machine, when the dolly 25 is in its right-hand position (FIGURE 1) the punches 36 are simultaneously advanced by the operation of the air operated piston and cylinder assemblies 34. The cutters thus penetrate the walls of the clay columns C and bear against the rubber sleeve 13 of the mandrel 11. The slugs thus formed pass up through the hollow tapered sleeve or nose 39 of the cutters and are subsequently ejected as the carrier bars are abruptly retracted. When the cutters engage the rubber sleeve 12 of the mandrel, both the dolly 25 and the mandrel 11 travel along with the clay columns C. Such movement of the dolly 25 is aided by a coil spring 41 which has one end anchored to a bracket 42 on a support member 32 and the opposite end of the spring being secured to an upright 26.

After a predetermined movement of the dolly 25 and mandrel 11, the several punches and their carriers 35 retract abruptly and the dolly is then moved from its left hand position shown in FIGURE 1 to its right hand or starting position by means of an air operated piston and cylinder assembly 43 which is carried by a frame upright 26. This operation of the assembly 43 places the coil spring 41 under tension so as to aid in the traveling movement of the dolly as above mentioned.

It will be understood that the mandrel returns to its original or right hand position (FIGURE 5) by the action of the coil spring 20, which was compressed during the movement of the mandrel from its right hand position to its left hand position. It will be manifest that the machine operates recurrently and as soon as one portion of the clay columns has been perforated, the machine returns to effect perforation of a succeeding portion of the columns. Thus, the entire length of the advancing clay columns are perforated by the recurrent action or operation of the machine.

Inasmuch as the controls for the operation of the air cylinders 34 and 43 form no part of the present invention, illustration thereof is not considered necessary. Any suitable mechanism for this purpose may be employed, as for example this may be achieved by means of a signal determined by an electromechanical timer associated with the cutter for cutting the columns into predetermined lengths, may control the operation of the mechanism. It will further be understood that the number of punches and their arrangement may be varied as desired. As shown, it will be apparent that 16 perforations are simultaneously punched in each of the columns C and in view of the manner in which the machine operates the holes so formed are cylindrical and free from any oval shapes which are regarded as being undesirable.

Numerous changes in details of construction, arrangement and operation may be effected without departing from the spirit of the invention, especially as defined by the appended claims.

What we claim is:

1. A machine for perforating a continuous tubular column of plastic material as it advances from the extruder, said machine comprising an elongate tubular mandrel adapted to fit within the plastic column; a stationary rod within the plastic column along which the mandrel travels, a cushioning covering for said mandrel, a mandrel actuating spring mounted on said stationary rod and engaging said mandrel so as to be compressed upon movement of said mandrel with said plastic column, a rectilinearly movable dolly on the outside of the plastic column, a mounting for the dolly enabling to and fro shifting movement thereof in a plane parallel to the advancing movement of the plastic column, perforating punches on the dolly, means to actuate said punches so that they extend through the walls of the column and against the cushioning covering for the mandrel, whereby both the dolly and mandrel are thus connected and advance along with the plastic column, said actuating means retracting said punches from the mandrel and plastic column after a predetermined interval thereby to enable the spring to return the mandrel to its starting position, and means for returning the dolly to its starting position after retraction of said punches.

2. A perforating machine as claimed in claim 1 comprising a fluid pressure linear motor for returning the dolly to its starting position.

3. A perforating machine as claimed in claim 1 in which the dolly includes an open frame through which the plastic column moves.

References Cited by the Examiner
UNITED STATES PATENTS

| | | |
|---|---|---|
| 1,781,992 | 11/30 | Thomas. |
| 2,075,038 | 3/37 | Hutchinson _____ 25—105 |
| 2,697,264 | 12/54 | Queberg. |
| 3,059,304 | 10/62 | Renkent et al. _____ 25—34 |

MICHAEL V. BRINDISI, *Primary Examiner.*

ROBERT F. WHITE, *Examiner.*